United States Patent [19]

Keske

[11] 4,006,797
[45] Feb. 8, 1977

[54] CAM ACTUATED LUBRICATION PUMP
[75] Inventor: Frank E. Keske, Chillicothe, Ill.
[73] Assignee: Caterpillar Tractor Co., Peoria, Ill.
[22] Filed: May 15, 1975
[21] Appl. No.: 577,810
[52] U.S. Cl. .............................. 184/27 R; 308/84; 417/214; 417/471
[51] Int. Cl.² ........................................ F16N 13/10
[58] Field of Search ............ 184/27 E, 27 R, 27 A, 184/27 B, 27 C, 27 D, 32, 34, 37, 45 R, 45 A, 47, 74, 75, 83, 101, 7 D, 7 E, 7 F; 308/5 R, 78, 84; 74/467; 417/214, 471

[56] References Cited
UNITED STATES PATENTS

| 1,000,722 | 8/1911 | Danver | 184/27 R |
| 1,213,747 | 1/1970 | Clehm | 308/84 |
| 1,382,490 | 6/1921 | Erickson | 184/45 R |
| 1,868,629 | 7/1932 | Cowles | 184/7 D |
| 1,958,396 | 5/1934 | Renfrew | 184/27 R |
| 2,320,140 | 5/1943 | Kocher | 184/27 R |
| 3,050,001 | 8/1962 | Links | 184/27 R X |

FOREIGN PATENTS OR APPLICATIONS

| 30,131 | 3/1956 | Germany | 184/27 R |
| 50,896 | 1/1910 | Switzerland | 184/27 R |
| 487,964 | 6/1938 | United Kingdom | 184/27 R |

Primary Examiner—Anton O. Oechsle
Assistant Examiner—Arnold W. Kramer
Attorney, Agent, or Firm—Phillips, Moore, Weissenberger, Lempio & Majestic

[57] ABSTRACT

A lubrication pump comprises a housing having a cup-shaped member reciprocally mounted thereon, a rod secured to the member and disposed internally thereof, a piston slidably mounted on the rod to define an expansible working chamber between the piston and the housing, a first check valve for communicating lubricating fluid into the chamber upon upward movement of the piston and a second check valve for communicating pressurized lubricating fluid exteriorly of the pump upon downward movement of the piston. A first coil spring is preferably mounted between the piston and member whereas a second coil spring is preferably mounted between the base of the housing and the piston.

9 Claims, 1 Drawing Figure

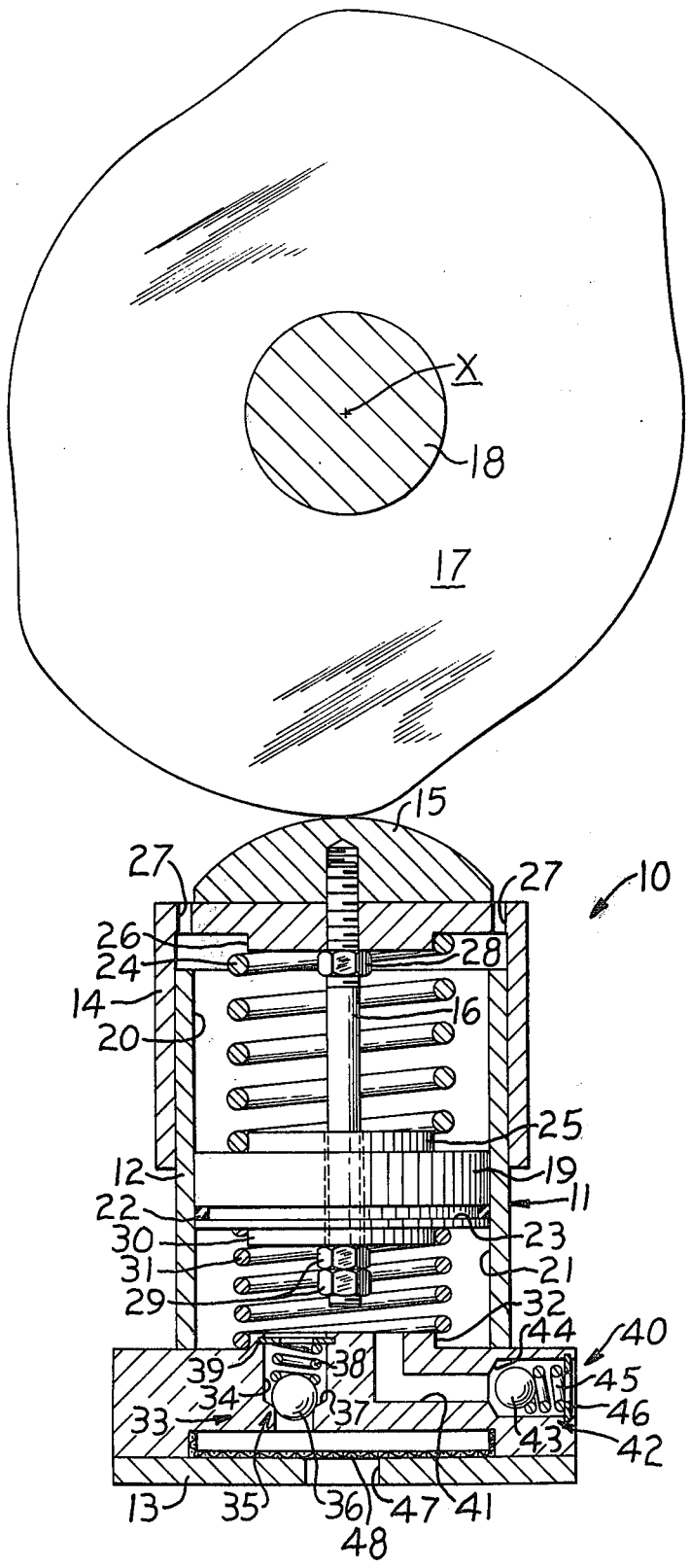

CAM ACTUATED LUBRICATION PUMP

BACKGROUND OF THE INVENTION

This invention relates to a high speed lubrication pump, particularly adapted for incorporation into a lubricating system for the pinion bearings of a differential or the like.

Conventional differentials for construction vehicles, such as the differential disclosed in U.S. Pat. No. 3,237,483, comprise a pair of face gears and a plurality of pinion gears intermeshed therebetween for permitting relative rotation between the face gears. The bearings mounting each of the pinion gears in the differential are subjected to loads of high magnitude during operation thereof to thus dictate the need for a lubrication system which will lubricate and cool such bearings.

Various pumps have been proposed therefor, such as gear and vane type pumps. Such conventional pumps are directionally limited to thus prevent adequate lubrication of the bearings during a reverse operation of the vehicle, for example. Also, such pumps may exhibit the inability to assure adequate lubrication to the bearings during low speed vehicle operations.

SUMMARY OF THE INVENTION

An object of this invention is to provide a non-complex and efficient pump which exhibits a long service life although capable of operating at high speeds. The pump, particularly adapted for use in a lubricating system wherein the pump is cam actuated, comprises a housing having a cup-shaped member reciprocally mounted thereon. A rod, secured to the member, has a piston reciprocally mounted thereon to define a pair of isolated and expansible first and second chambers on either side thereof.

Inlet means, including normally closed first valve means, selectively communicates fluid into the second chamber upon expansion thereof in response to reciprocal movement of the piston in a first direction. Outlet means, including second valve means, selectively communicates pressurized fluid from the second chamber and exteriorly of the pump upon contraction of the second chamber in response to reciprocal movement of the piston in a second, opposite direction. In the preferred embodiment of this invention, a compression spring is disposed between the piston and member and also between the piston and a base of the housing.

BRIEF DESCRIPTION OF THE DRAWING

Other objects of this invention will become apparent from the following description and accompanying drawing which is a longitudinal sectional view of a lubrication pump embodying this invention and adapted to be cam-actuated.

DETAILED DESCRIPTION

The drawing illustrates a pump 10 comprising a stationary housing 11 including an upstanding cylindrical member 12 having a base 13 secured thereunder. An inverted cup-shaped member 14 is reciprocally mounted on a first or upper end of member 12 and has an arcuate cam follower 15 secured thereon by an elongated bolt 16. A plate cam 17 is secured to a drive shaft 18 for rotation about axis X thereof for engaging cam follower 15 to reciprocate member 14 on housing 11.

The shank of bolt 16 forms a rod having an annular piston 19 reciprocally mounted thereon to define a pair of isolated and expansible first and second chambers 20 and 21 on either side thereof. An annular seal 22 is disposed in the like-shaped groove 23 formed on the piston to seal the chambers from each other. A first compression spring means or coil spring 24 has its lower end mounted on a boss 25 formed integrally with piston 19 and its upper end mounted on a boss 26 formed integrally on the underside of the cap portion of member 14. The cap portion of such member further comprises a plurality of holes 27 formed therethrough to provide vent means communicating chamber 20 with ambient.

Bolt 16 has a lock nut 28 threadably mounted on the upper end thereof to secure member 14 and cam follower 15 together and a pair of lock nuts 29 threadably mounted on the lower end thereof to provide adjustable stop means setting the maximum downward movement of piston 19 relative to bolt 16. The latter lock nuts engage a boss 30 formed on an underside of piston 19 which further mounts the upper end of a second compression spring means or coil spring 31 thereon. The lower or second end of spring 31 is mounted on an annular boss 32 formed on an upper side of base 13 of housing 11.

An inlet means 33 is provided in base 13 of the housing for communicating fluid into chamber 21 upon expansion thereof in response to reciprocal movement of piston 19 in a first direction away from the base. Such inlet means comprises an inlet passage 34 having a normally closed first valve means or check valve 35 mounted therein. The check valve comprises a ball 36 normally spring biased onto a conical seat 37 by a compression coil spring 38, disposed between the ball and a snap ring 39 attached to the housing.

An outlet means 40 is also provided in the housing for selectively communicating pressurized fluid from chamber 21 and exteriorly of the pump upon contraction of the chamber in response to reciprocal movement of piston 19 in a second, downward direction. The outlet means comprises an outlet passage 41 suitably formed in the housing and normally closed by a second valve means or check valve 42, shown in its open position in the drawing. The second check valve comprises a ball 43 biased towards a conical seat 44 by a compression coil spring 45, disposed between the ball and a snap ring 46 attached to the housing. The downstream side of passage 41 is adapted to be attached to a suitable conduit (not shown) for communicating lubricating fluid to the bearings of a differential, for example. The pump is at least partially submerged in a pool of lubricating fluid to constantly expose inlet means 33 to the fluid via an inlet 47 and a screen 48.

In operation, rotation of cam 17, which may be suitably attached to the carrier of a differential (not shown), will function to reciprocate member 14 to alternately charge and exhaust chamber 21 of lubricating fluid. In the position shown, the follower 15 is engaged with a lobe of the cam to depress member 14, spring 24 and thus piston 19 to open check valve 42 to communicate pressurized lubricating fluid from chamber 21 exteriorly of the pump, via opened passage 41.

Upon continued rotation of the cam to engage follower 15 with a reduced cam portion thereof, spring 31 will function to move piston 19 upwardly to open check valve 35 and check valve 42 will close automatically. The expansion of chamber 21 will function to decrease the pressure therein whereby fluid will be drawn into the chamber via inlet 47 and inlet passage 34. When the discharge pressure of the above-described variable displacement pump exceeds 30 psi, for example, the stroke of piston 19 may approach zero displacement by a balancing the combined force of the pressurized fluid in chamber 21 and the force of spring 31 against the force of spring 24. Such action will thus automatically limit fluid flow from the pump without the use of external relief valves or the like.

Although for purposes of this invention it is preferable to slidably mount piston 19 on rod 16, in certain pump applications it may prove desirable to secure the piston to the rod to permit simultaneous reciprocation thereof. In such event the pump will provide a sequential series of fixed displacements in response to rotation of cam 17.

I claim:
1. A pump adapted for use in a lubrication system comprising
    a housing,
    a cup-shaped member reciprocally mounted on a first end of said housing,
    a rod fixedly secured to said member and disposed internally thereof,
    a piston reciprocally mounted on said rod to define a pair of isolated and expansible first and second chambers on either side thereof,
    first compression spring means disposed in said first chamber between said piston and said member and second compression spring means disposed in said second chamber between said piston and said housing,
    inlet means, including normally closed first valve means, for communicating fluid into said second chamber upon expansion thereof in response to reciprocal movement of said piston in a first direction and
    outlet means, including normally closed second valve means, for communicating pressurized fluid from said second chamber and exteriorly of said pump upon contraction of said second chamber in response to reciprocal movement of said piston in a second direction opposite to said first direction,
    said pump being operable to automatically limit fluid flow through said second valve means when the combined pressure of the fluid and the spring in said second chamber equals the compression force of the spring in said first chamber.

2. The pump of claim 1 wherein each end of each of said first and second spring means is mounted on a boss formed integrally on each respective one of said piston, member and housing.

3. The pump of claim 1 further comprising vent means formed through said member for communicating said first chamber with ambient.

4. The pump of claim 1 further comprising a follower attached to a closed head portion of said member and a cam rotatably mounted adjacent to said follower and engaged therewith.

5. The pump of claim 4 wherein said rod comprises a bolt attaching said follower to said member.

6. The pump of claim 1 wherein said member is cylindrical and is reciprocally mounted exteriorly on a cylindrical member of said housing.

7. The pump of claim 1 wherein each of said first and second valve means constitutes a check valve.

8. The pump of claim 7 wherein said housing comprises a cylindrical member having an open first end reciprocally mounting said cup-shaped member thereon and a second end secured to a base, said first and second check valves disposed in said base.

9. The pump of claim 8 further comprising means forming an inlet in said base and a screen disposed between said inlet and said first check valve.

* * * * *